United States Patent [19]

Lindner et al.

[11] 4,079,597

[45] Mar. 21, 1978

[54] DRIVE UNIT FOR AWNINGS AND ROLLER BLINDS

[75] Inventors: Adolf Lindner, Rottendorf; Richard Werner, Pfungstadt-Hahn; Rudolf Weppler, Lengfeld, all of Germany

[73] Assignee: Siemens Aktiengesellschaft, Munich, Germany

[21] Appl. No.: 667,545

[22] Filed: Mar. 17, 1976

[30] Foreign Application Priority Data

Mar. 19, 1975 Germany .......................... 2512070

[51] Int. Cl.2 .............................................. F16H 3/44

[52] U.S. Cl. .......................................... 64/5; 74/789; 310/67 R; 192/2

[58] Field of Search ....................... 64/5, 6, 4; 74/789; 310/83, 67, 68, 71, 72, 89; 160/310

[56] References Cited

U.S. PATENT DOCUMENTS

| | | | |
|---|---|---|---|
| 1,742,094 | 12/1929 | Perks et al. | 310/67 R |
| 1,771,281 | 7/1930 | Wilsing | 310/77 |
| 1,896,623 | 2/1933 | Hixon | 160/310 |
| 1,923,175 | 8/1933 | Stuart | 160/310 |
| 2,579,368 | 12/1951 | Schoepe | 74/789 |
| 2,658,571 | 11/1953 | Guth et al. | 160/310 |

*Primary Examiner*—Benjamin W. Wyche
*Assistant Examiner*—R. C. Turner
*Attorney, Agent, or Firm*—Kenyon & Kenyon, Reilly, Carr & Chapin

[57] ABSTRACT

A drive unit for awnings and roller blinds is disclosed. The drive unit is adapted to be installed in a tubular shaft upon which an awning cloth or the roller blind is to be wound. More specifically, the unit comprises the following components which are arranged along a common axis: an electric motor; a reduction gear; a shut-off unit with associated setting means; and a coupling member adapted to transmit the torque from the reduction gear to the tubular shaft. In accordance with the invention, the reduction gear is arranged between the electric motor and the shut-off unit. Additionally, a hollow gear wheel is provided as the coupling member. The latter gear wheel is adapted to support and to be drivingly connectable to the surrounding tubular shaft, and is also in driving connection with the reduction gear. With the drive unit designed as above, its axial dimension can be made relatively short.

17 Claims, 3 Drawing Figures

DRIVE UNIT FOR AWNINGS AND ROLLER BLINDS

BACKGROUND OF THE INVENTION

FIELD OF THE INVENTION

This invention relates to a drive unit for awnings and roller blinds and, in particular, a drive unit which is to be installed in a tubular shaft upon which an awning or the roller blind is to be wound.

In one drive unit of this type, the entire drive unit is comprised of the following individual elements which are arranged one after the other in the order indicated along a common axis: an output shaft; a reduction gear; an electric motor; a capacitor; a shut-off unit with contactor and setting means for setting the end positions of the roller blind or the awning cloth; and a coupling member adapted to transmit the torque from the reduction gear to the tubular shaft.

It is an object of the present invention to provide a drive unit which can have a shorter axial length than the aforesaid drive unit and is simpler to install and easier to service.

SUMMARY OF THE INVENTION

In accordance with the principles of the present invention, the above and other objectives are accomplished in a drive unit of the above type by arranging the reduction gear of the unit between the electric motor and the shut-off unit thereof, and by employing as the coupling member of the unit a hollow gear wheel which is adapted to support and be drivingly connectable to the tubular shaft concentrically surrounding the unit and which is in driving connection with the reduction gear. Additionally, the capacitor of the drive unit is advantageously fastened at the BS end bell of the electric motor, the latter end bell being at the end of the drive unit facing away from the shut-off unit.

With the drive unit designed as aforesaid, the output moment of the unit is at a considerably shorter distance from the mounting flange at the outer end of the tubular shaft. Also, the motor and the capacitor can be more easily removed from the unit for repair, as they are disposed at an outer end of the unit. The use of an additional drive with a separate drive shaft for the shut-off unit also is now unnecessary, as the shut-off unit and the reduction gear are axially arranged directly behind one another. Additionally, since the capacitor is bolted to the outer free end of the drive unit, its size can largely be chosen as desired without effecting the overall design of the shut-off unit.

Advantageously, a casing of the capacitor is likewise, fastened at the BS end bell of the motor and is provided with a support rim which projects radially beyond the BS end bell and the rest of the casing and is adapted to support the tubular shaft. The latter support rim prevents undesirable rubbing of the shaft on the other parts of the drive unit, in case the unit is not properly aligned with the shaft axis when inserted into the shaft. Also, advantageously, the hollow gear wheel is provided at its outer circumference and, in particular, at its end facing the outer end of the tubular shaft, with bosses and/or slots which are adapted to engage with corresponding slots and/or bosses on the tubular shaft. A tight fitting drive connection thus results when the drive unit is inserted into the tubular shaft, and simple driving of the tubular shaft directly at the outer mounting flange of the tubular shaft is possible without additional parts.

In the illustrative embodiment of the invention to be described herein, the drive unit comprises a two-stage planetary drive which follows the electric motor on the AS end bell side and which is itself followed by a spur gear drive. Furthermore, the entire gear housing portion of the unit is advantageously divided into first and second housing parts. The first housing part houses the spur gear drive, the shut-off unit with its integrated setting means and a reduction gear arranged between the shut-off unit and the spur gear drive. The second gear housing part, on the other hand, houses the planetary drive and the AS end bell of the electric motor to which it is integrated.

The unit is further simplified by the fact that the second gear housing part can be tightly clamped together with the lamination stack and the BS end bell of the motor by tie bolts which are screwed into the integrated AS end bell and can be tightened from the BS end bell side of the electric motor, which preferably has no housing. Thus, the above-mentioned components of the drive unit can be connected with each other in a simple manner from the BS end bell side. To further simplify the drive unit, the intermediary gears of the spur gear drive are mounted on hollow shafts through which screws for joining the two housing parts can be inserted and tightened from the outer end, facing the shut-off unit, of the drive unit.

BRIEF DESCRIPTION OF THE DRAWINGS

The above and other features and aspects of the present invention will become more apparent upon reading the following detailed description in conjunction with accompanying drawings, in which.

DETAILED DESCRIPTION

Figure 1:
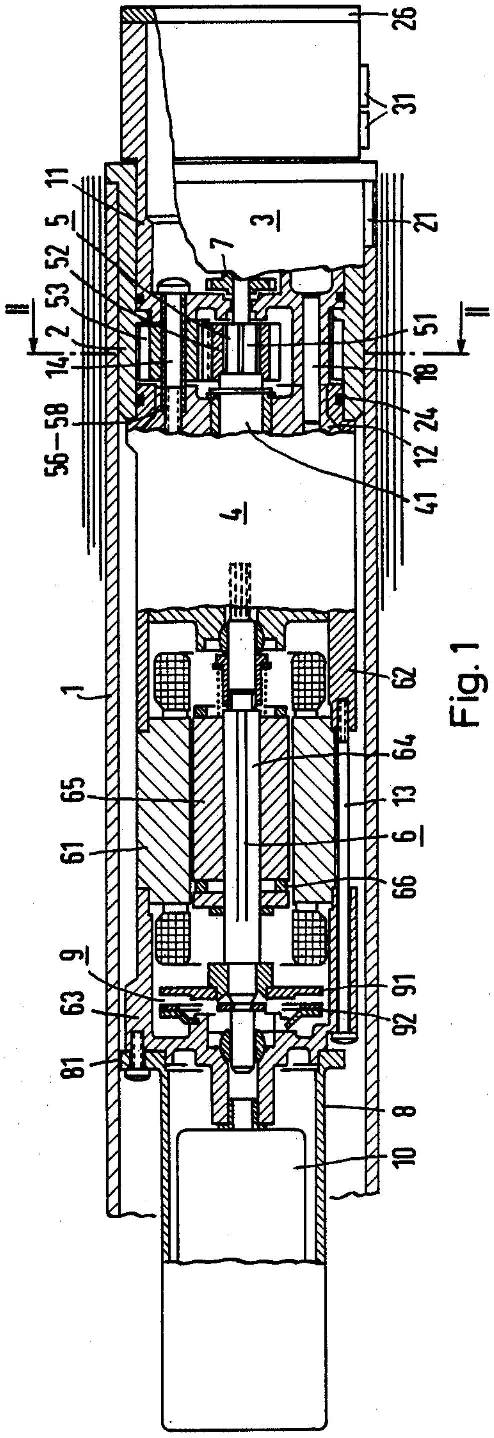
FIG. 1 shows a partial cross-sectional view of a drive unit in accordance with the principles of the present invention.

FIG. 1 shows a drive unit in accordance with the principles of the present invention. As illustrated the unit is housed in a tubular shaft 1 into which it has been inserted through the right-hand outer end of the shaft. The drive unit comprises a number of components which are arranged one behind the other along a common axis and which are connected with each other. More specifically, going from left to right, the unit comprises the following elements:

a capacitor 10 with casing 8;

an electric motor 6 which has no housing and which includes a stator lamination stack 61, an AS end bell 62, a BS end bell 63 and a rotor 65;

a two-stage planetary drive 4;

a spur gear drive 5 which includes a hollow gear wheel 2 for transmitting torque to the surrounding tubular shaft 1;

a reduction gear 7;

a shut-off unit 3 which includes a setting means 31 which can be operated from outside of the right-hand outer end of the tubular shaft 1;

and a transparent cover 26.

As above-indicated, the entire drive unit is inserted into the tubular shaft 1 through its right-hand outer end.

To facilitate proper alignment of the unit within the shaft, bosses 21 are provided at the right-hand outer end of the hollow gear wheel 2. These bosses engage with corresponding slots in the tubular shaft 1 so as to provide in a simple manner a contact surface and close-fitting drive for transmitting the torque from the electric motor 6, via the planetary drive 4, the spur gear drive 5 and the internally geared hollow wheel 2, to the shaft 1. As can be seen, the tubular shaft 1 is supported predominantly by the hollow gear wheel 2, but additional support is also provided by a support rim 81 extending from the mounting flange of the capacitor casing 8.

The rotor 65 of electric motor 6 is arranged on a shaft 64 and is provided with an intermediate shorting ring 66 and with a sliding-armature brake 9. The latter brake is integrated within the BS end bell 63. When the motor 6 is switched on the rotor 65 and its intermediate shorting ring 66 provide a large axial force for lifting the brake disc 91 of the sliding-armature brake 9 off the stationary counter brake lining 92, which is firmly connected with the BS end bell 63.

The gear housing portion of the drive unit is divided into two gear housing parts. A first gear housing part 11 houses the spur gear drive 5, the reduction gear 7, and the shut-off unit 3 with its integrated setting means 31. A second gear housing part 12, on the other hand, houses the planetary drive 4 with the integrated AS end bell 62 of the electric motor 6.

Figure 2:
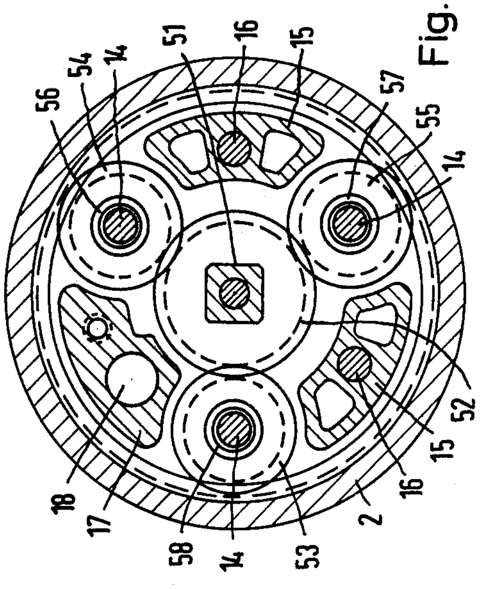
FIG. 2 shows a cross section through the drive unit of FIG. 1 along the plane II—II.

As may be seen from FIG. 1 and particularly from FIG. 2, in the present illustrative embodiment, the spur gear drive 5 acts on the internally-geared hollow wheel 2 via intermediate gears 53 to 55 having fixed bearing axes. The gears 53 to 55, in turn, are driven by a central gear 52 which is arranged on a central shaft 51, the latter shaft being aligned with the electric motor shaft 64 and the central shaft 41 of the planetary gear. The intermediate gears 53 to 55 are supported on hollow shafts through which screws 14 for bolting the two gear housing parts 11, 12 together are inserted and tightened from the outer end of the drive unit, which is facing the shut-off unit.

Advantageously, also arranged on the spur gear 5 between the intermediate gear bearings are spacers 15 whose securing pins 16 permit the mutual aligning of the two housing halves 11, 12. Spur gear drive 5 also includes at least one spacer 17 having an axial hole 18, through which an electrical line connection 19 is led from the electric motor 6 to the shut-off unit 3.

Figure 3:
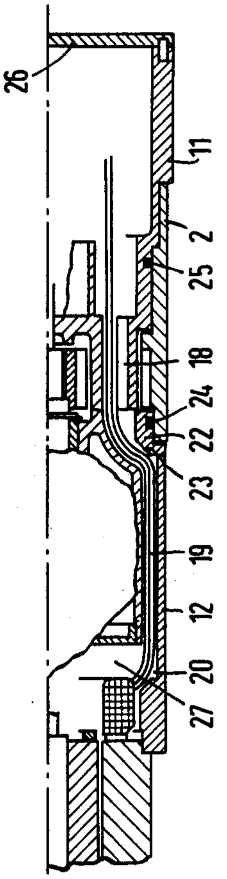
FIG. 3 shows in greater detail a portion of the section of FIG. 1.

The connecting line 19 can be run through the housing parts 11, 12 without limiting the space provided for the planetary gear 4, by providing a longitudinal hole 20 in the outer wall of the second housing part 12 in the region of the planetary gear 4 which has a radially directed opening 27 at the BS end bell side of the housing part 12. Additionally by pressing an intermediate ring 22 with an inner bevel 23 onto the end of the second housing part 12 which faces the spur gear drive 5, the connecting line 19 upon passing from the longitudinal hole 20 will be deflected toward the further inwardly disposed longitudinal hole 18 in the spacer 17. Thus, as illustrated in FIG. 3, the connecting line 19 runs past the planetary gear 4 and is deflected by the bevel 23 so as to pass through the longitudinal hole 18 of the spacer 17, which is stationary within the spur gear drive 5. The longitudinal hole 19 can be formed by drilling into the drive housing part 12 from the spur gear side while the radial opening 27 can be formed by perforating the housing part.

As can be seen, the ring 22 also provides support for the hollow gear wheel 2. The latter wheel, in turn is sealed via sealing rings 24 and 25 against the housing parts 11 and 12.

To simplify the assembly of the individual components of the present drive unit, the first gear housing part 11 is, on the one hand screwed via the screws 14 to the second gear housing part 12 and is, on the other hand, advantageously firmly clamped by the tie bolts 13, which can be screwed into the integrated AS end bell 62 and can be tightened from the BS end bell side 63, with the lamination stack 61 and the BS end bell 63. Also advantageously, cover 26 is selected to be transparent so as to permit the shut-off unit to be observed and its setting checked without having to disassemble any of the parts of the drive unit.

What is claimed is:

1. A drive unit adapted for installation into a tubular shaft upon which is to be wound an awning or roller blind comprising:

an electric motor;

shut off means, including a setting means, for shutting off said motor;

a reduction gear connected to said motor and arranged between said motor and said shut off means;

and a coupling member adapted to transmit torque from said reduction gear to said shaft, said coupling member including a hollow gear wheel which is in driving connection with said reduction gear and which is adapted to support and to be drivingly connectable to said shaft.

2. A drive unit in accordance with claim 1 in which said electric motor, reduction gear, coupling member and shut off means are arranged along a common axis.

3. A drive unit in accordance with claim 1 further including a capacitor fastened to the BS end bell of said electric motor, said BS end bell of said electric motor facing away from said drive unit.

4. A drive unit in accordance with claim 1 in which said capacitor includes a casing fastened to said BS end bell said casing having a support rim which extends radially beyond said BS end bell and the remaining portions of said casing and which is adapted to support said shaft.

5. A drive unit in accordance with claim 1 in which said hollow gear wheel has on its outer circumference bosses adapted to engage slots on said shaft, said engagement providing a tight-fitting driving connection.

6. A drive unit in accordance with claim 1 in which said hollow gear wheel has on its outer circumference slots adapted to engage bosses on said shaft, said engagement providing a tight fitting driving connection.

7. A drive unit in accordance with claim 4 in which said reduction gear includes:

a two stage planetary gear situated on the AS bell side of said motor;

and a spur gear drive situated on the side of said planetary gear opposite the side facing toward said AS bell side.

8. A drive unit in accordance with claim 7 in which said spur gear drive further includes:

a central gear arranged on a central shaft aligned with the shaft of said motor and the central shaft of said planetary drive;

a number of intermediate gears having fixed bearing axes, said intermediate gears being arranged to be driven by said central gear and to drive said gear wheel.

9. A drive unit in accordance with claim 7 further including a second reduction gear arranged between and functionally connecting said spur gear drive and said shut-off means.

10. A drive unit in accordance with claim 9 in which said spur gear drive, second reduction gear and shut off means form a first housing part and said planetary drive and AS end bell of said electric motor form a second housing part.

11. A drive unit in accordance with claim 10 in which:

said second housing part is adapted to be clamped with the stack of laminations and the BS end bell of said motor by tie bolts which can be screwed into said AS end bell and tightened from said BS end bell of said motor.

12. A drive unit in accordance with claim 10 further including:

hollow shafts for supporting said intermediate gears, said shafts being adapted to receive screws for bolting said housing parts together inserted from the side of said spur gear drive facing said shut off units.

13. A drive unit in accordance with claim 10 which further includes:

a number of spacers arranged between said intermediate bearings of said spur gear drive;

securing pins arranged on said spacers for enabling mutual alignment of said first and second housing parts;

and at least one additional spacer having a hole adapted to receive an electrical connecting line running from said electric motor to said shut off unit.

14. A drive unit in accordance with claim 13 in which the outer wall of said second housing part has a longitudinally directed hole with a radially directed opening in the region of said planetary drive at the BS end bell of said motor, said hole being adapted to receive an electrical connecting line running from said electric motor to said shut-off unit.

15. A drive unit in accordance with claim 14 further including:

an intermediate ring having an inner bevel, said ring being arranged on the end face of said housing part facing said spur gear drive and being adapted to deflect said connecting line after passing through said longitudinal hole in said second housing part inwardly toward said hole in said additional spacer.

16. A drive unit in accordance with claim 15 in which:

said hollow gear is supported on one side on said intermediate ring and on its other side on said first housing part; and said drive unit further includes sealing rings for sealing said hollow gear against said housing parts.

17. A drive unit in accordance with claim 1 further including:

a transparent cover situated at the outer end of said shut-off unit.

* * * * *